United States Patent
Duval et al.

(10) Patent No.: US 10,691,645 B2
(45) Date of Patent: Jun. 23, 2020

(54) SYSTEM AND METHOD FOR CLOUD-BASED READ-ONLY FOLDER SYNCHRONIZATION

(71) Applicant: Open Text Holdings, Inc., San Mateo, CA (US)

(72) Inventors: Craig Duval, San Jose, CA (US); Tim A. Leiter, San Jose, CA (US)

(73) Assignee: Open Text Holdlings, Inc., San Mateo, CA (US)

(*) Notice: Subject to any disclaimer, the term of this patent is extended or adjusted under 35 U.S.C. 154(b) by 0 days.

(21) Appl. No.: 15/925,107

(22) Filed: Mar. 19, 2018

(65) Prior Publication Data
US 2018/0210894 A1    Jul. 26, 2018

Related U.S. Application Data

(63) Continuation of application No. 13/785,470, filed on Mar. 5, 2013, now Pat. No. 9,934,241.

(51) Int. Cl.
*G06F 16/30* (2019.01)
*G06F 16/178* (2019.01)
*G06F 16/176* (2019.01)

(52) U.S. Cl.
CPC .......... *G06F 16/178* (2019.01); *G06F 16/176* (2019.01)

(58) Field of Classification Search
CPC .............................................. G06F 17/30575
See application file for complete search history.

(56) References Cited

U.S. PATENT DOCUMENTS

| | | |
|---|---|---|
| 8,516,480 B1 | 8/2013 | Epstein et al. |
| 9,213,718 B1 | 12/2015 | Hrebicek |
| 9,934,241 B2 | 4/2018 | Duval et al. |
| 2008/0098042 A1 | 4/2008 | Tian et al. |
| 2008/0270547 A1 | 10/2008 | Glickstien et al. |
| 2009/0300169 A1* | 12/2009 | Sagar ............ H04L 41/00 709/224 |
| 2011/0087690 A1* | 4/2011 | Cairns ............ G06F 21/6218 707/769 |
| 2012/0226869 A1 | 9/2012 | Kirihata et al. |
| 2013/0013560 A1* | 1/2013 | Goldberg ......... G06F 16/178 707/634 |
| 2013/0179947 A1 | 7/2013 | Kline, III et al. |
| 2013/0226876 A1 | 8/2013 | Gati |
| 2013/0268480 A1 | 10/2013 | Dorman |

(Continued)

OTHER PUBLICATIONS

"Yousendit™, Enterprise Edition Administrator's Guide", Yousendit, Inc., Campbell, CA, Jan. 12, 2012, 44 pgs.

(Continued)

*Primary Examiner* — Mahesh H Dwivedi
(74) *Attorney, Agent, or Firm* — Sprinkle IP Law Group (57) ABSTRACT

A system and method are provided for synchronizing read-only folders from a cloud-based server. Users can set read-only permissions when sharing folders with other users. The read-only permissions are enforced by client devices of the users downloading content of the folders from the server. To prevent local changes made by a user having read-only access to a folder from being overwritten, the user's client identifies modified folders as local content. After identifying a modified folder as local content, the client may retrieve the original folder from the cloud-based server.

20 Claims, 6 Drawing Sheets

(56) References Cited

U.S. PATENT DOCUMENTS

| | | |
|---|---|---|
| 2013/0283060 A1 | 10/2013 | Kulkarni et al. |
| 2014/0172799 A1 | 6/2014 | Dorman |
| 2014/0201145 A1 | 7/2014 | Dorman et al. |
| 2014/0258350 A1 | 9/2014 | Duval et al. |
| 2014/0337482 A1* | 11/2014 | Houston ............... H04L 67/06 709/219 |

OTHER PUBLICATIONS

Senad, Dizdar, "How to create read-only Dropbox shared folders (using cloudHQ)", Jan. 10, 2013, 6 pgs. at https://blog.cloudhq.net/how-to-create-read-only-dropbox-shared-folders-using/.

YouSendIt Enterprise, Application Programming Interface (API) Datasheet, YouSendIt™, Inc., Campbell, CA, 2011, 2 pgs.

YouSendIt Security Datasheet, YouSendIt™, Inc., Campbell, CA, 2010, 3 pgs.

Workstream by YouSendIt™, Application Programming Interfaces (APIs) Datasheet, YouSendIt™, Inc., Campbell, CA, 2012, 2 pgs.

"SaaS Security Assessment Guide," Hightail, www.hightail.com/enterprise, undated, 18 pgs.

"YouSendIt Enterprise: Enterprise Management Services Datasheet," YouSendIt, Inc., Campbell, CA, 2011, 3 pgs.

Pinola, Melanie, YouSendIt Offers Dropbox-Like Unlimited Cloud Storage and File Syncing, Jul. 26, 2011, 4 pgs.

Office Action for U.S. Appl. No. 13/785,470, dated Jun. 5, 2015, 26 pgs.

Office Action for U.S. Appl. No. 13/785,470, dated May 19, 2016, 41 pgs.

Office Action for U.S. Appl. No. 13/785,470, dated Nov. 16, 2016, 49 pgs.

Office Action for U.S. Appl. No. 13/785,470, dated Aug. 10, 2017, 50 pgs.

Notice of Allowance for U.S. Appl. No. 13/785,470, dated Jan. 4, 2018, 6 pgs.

\* cited by examiner

SYSTEM AND METHOD FOR CLOUD-BASED READ-ONLY FOLDER SYNCHRONIZATION

CROSS-REFERENCE TO RELATED APPLICATION

This application is a continuation of, and claims a benefit of priority under 35 U.S.C. 120 of the filing date of U.S. patent application Ser. No. 13/785,470, filed on Mar. 5, 2013, now U.S. Pat. No. 9,934,241 entitled "System and Method for Cloud-Based Read-Only Folder Synchronization", the entire contents of which are hereby expressly incorporated by reference for all purposes.

FIELD OF THE INVENTION

This invention relates generally to cloud-based folder synchronization, and in particular to managing read-only permissions of synchronized folders.

BACKGROUND

Cloud storage enables users to access files from multiple devices and to share files with other users. Files are uploaded to one or more cloud-based servers and distributed to client devices authorized to access the shared files. The client devices may continuously or periodically upload changes to a shared file to the server and download new content stored on the server, effectively synchronizing files between the client devices.

When an author of a file shares the file with other users ("sharees"), the author may define permissions specifying whether the sharees can edit the file. An author may specify read/write permissions for the sharees, in which modifications the sharees make to a file may be uploaded to the cloud-based server and distributed to the author and other sharees. Alternatively, an author may specify read-only permissions for the sharees, allowing sharees to access a file but not distribute their edits to the file to other users. However, a sharee may bypass the read-only permissions or wish to modify a read-only file. If a sharee modifies a file that is synchronized from a server, any changes the sharee makes to the file may be overwritten at the next synchronization cycle. As a result, sharees lose any changes they make to a read-only file on their local device.

SUMMARY

Embodiments of the invention provide a method for cloud-based read-only folder synchronization. In one embodiment, the method comprises the steps of accessing a first domain having a collection of files, each file having read-only permissions on a local device and synchronized from a server; detecting a modification to a subset of the first domain at the local device; identifying the modified subset as a second domain, the second domain including local content and associated with the first domain; and retrieving the subset of the first domain from the server.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
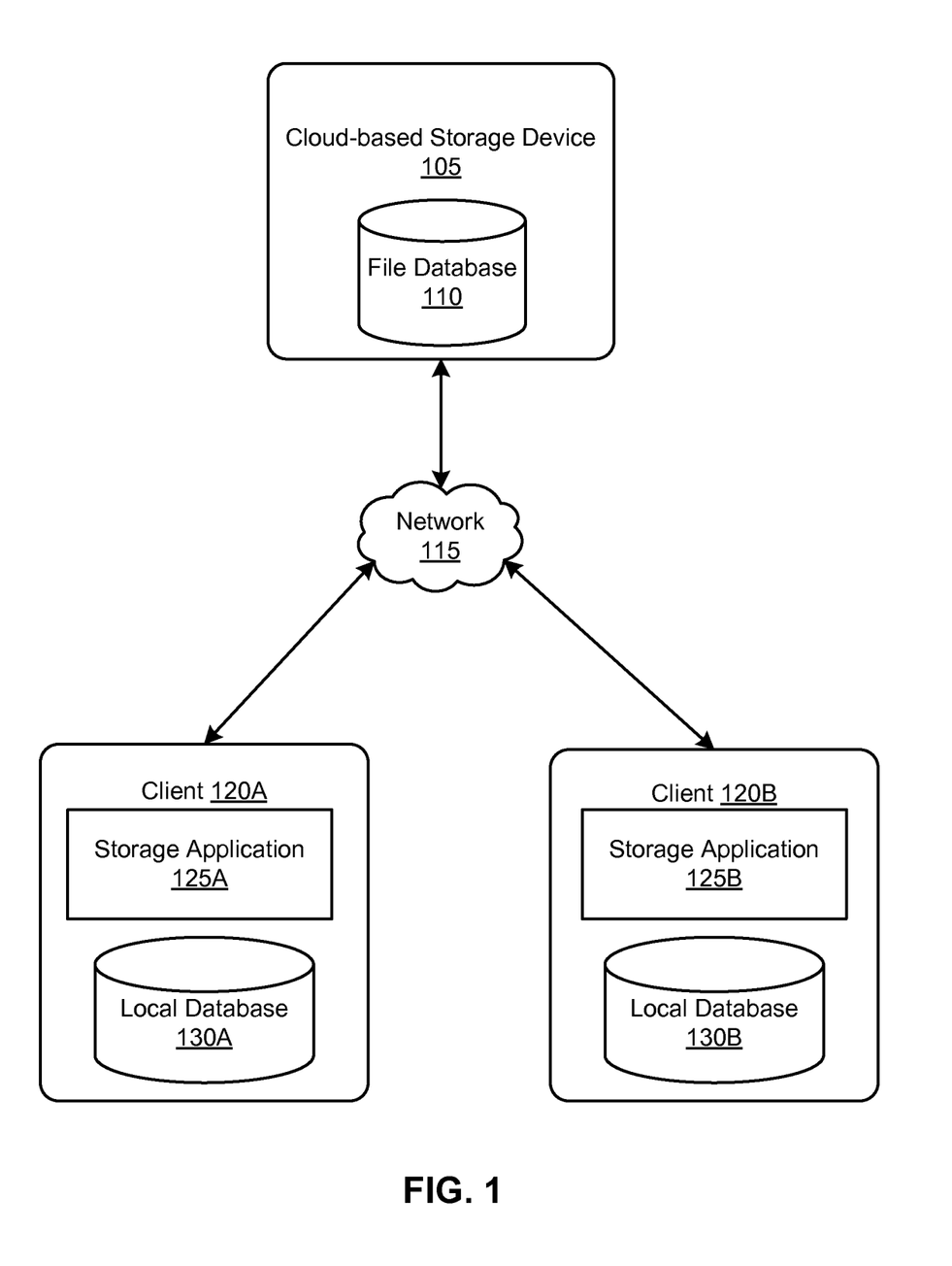
FIG. 1 is a high-level block diagram of an environment for synchronizing read-only content, according to one embodiment.

FIG. 1 is a high-level block diagram of an environment for synchronizing read-only content, according to one embodiment. FIG. 1 illustrates a cloud-based storage device 105 and client devices 120A and 120B communicating through a networking 115. Only two client devices 120 are illustrated in FIG. 1 to simplify and clarify the description, although any number of clients 120 may communicate with the cloud-based storage device 105.

The cloud-based storage device 105 is configured as one or more servers that receive files from clients 120 and push files to the clients 120. The storage device 105 includes one or more file databases 110 to store files. In various embodiments, the file database 110 may be configured as a single database or a distributed database. Furthermore, the cloud-based storage device 105 may encrypt files using AES 128- or 256-bit encryption, or other encryption formats, to prevent unauthorized access to files stored in the file database 110.

The files served by the cloud-based storage device 105 include different types of content files stored in different formats. For example, the files can include different word processor, spreadsheet, image, video, or music content. The various document formats include, for example, Microsoft Word™ documents (DOC), Apple Pages™ documents (PAGES), Office Open XML Text documents (DOCX), Adobe™ Portable Document Format documents (PDF), Microsoft Excel™ documents (XLS), Microsoft Windows Bitmap™ image documents (BMP), Compuserve Graphics Interchange Format™ image documents (GIF), Joint Photographic Experts Group image documents (JPEG), text files (TXT), Microsoft Windows Media Audio™ audio files (WMA), MPEG Layer 3 files (MP3), MPEG Layer 4 files (MP4), Apple Audio Video Interleave™ audio files (AVI), including any variants and/or derivatives of the above formats.

The client devices 120 execute a storage application 125 that enables users to interact with files on the cloud-based storage device 105. The storage application 125 may be integrated into the client 120 operating system, a browser, or another program (e.g., an email program). Additionally or alternatively, the storage application 125 may include a web-based user interface enabling user access to files. The client devices 120 may also execute various applications enabling users to view and edit content of files, such as a word processing application, a spreadsheet application, or a music, video, or photo editing application.

The storage application 125 manages files and user access to files. The storage application 125 may provide security keys to the cloud-based storage device 105 to authenticate the client 120 or the user of the client 120 for accessing files in the file database 110. For example, a user may create an account on the cloud-based storage device 105. The storage application 125 provides the user's login credentials to the storage device 105 to enable a user to upload files to or retrieve files from the file database 110.

In one embodiment, a user can identify files saved on a client 120 to the storage application 125 for uploading to the cloud-based storage device 105. For example, a user may move files into a folder of the storage application 125. Alternatively, a user may interact with a user interface of the storage application 125 to select files stored on the client 120 for uploading to the storage device 105. For example, the storage application 125 may present a user with a list of files and folders stored on the client 120. A user may select one or more files or folders from the list by, for example, selecting a check box adjacent to the desired file or folder. In another embodiment, the storage application 125 may upload all files stored on the client 120 to the storage device 105 until a user indicates that a file is not to be uploaded.

The storage application 125 may maintain a local database 130 listing files uploaded to the storage device 105. Entries for each file in the local database 130 may include the location of the files on the storage device 105, metadata associated with each file, or other information. When a user requests access to a file stored on the storage device 105, the storage application 125 may access the information stored in the local database 130 to determine the location of the requested file and any other relevant information.

In one embodiment, a user may organize files in a folder hierarchy, a logical structure supporting a user's organization of files and folders. When a user creates a folder hierarchy in the storage application 125 or on the client 120, the structure may be mirrored in the file database 110 and distributed to other authorized devices. For example, if a user defines a folder hierarchy in the storage application 125A and authorizes client 120B to access the folders and their content, the folders are also organized by the storage application 125B in the defined hierarchy.

When the storage application 125 uploads files to the cloud-based storage device 105, the cloud-based storage device 105 enables file sharing and synchronization between a plurality of client devices 120. A user may define a number of different configurations for file synchronization and sharing. In one configuration, a storage application 125, such as the storage application 125A, uploads a file to the cloud-based storage device 105 for backup or recovery, but permits only the storage application 125A to access the file. Such a file is referred to herein as a "local content" file. In another configuration, the storage application 125 uploads a file to the cloud-based storage device 105, where it is synchronized between a user's devices. Files synchronized by the second configuration are referred to herein as "private content." For example, a user may register a laptop computer, a desktop computer, and a mobile phone to his user account on the cloud-based storage device 105 by providing his login credentials to storage applications 125 executing on each device. If a user designates a file as private content, it is synchronized between the registered devices. A third configuration enables a user to authorize access of clients 120 to a file whether or not the clients 120 are registered to the user's account. Referred to herein as "shared content," such files may be viewed, edited, and synchronized between authorized clients 120, depending on permissions of the file.

A user can use one client, such as the client 120A, to share a file or folder with a user of another client, such as the client 120B. For example, the user of client 120A can send a link to the user of client 120B by email or SMS. The link indicates a location of the shared file in the file database 110. When the user of the client 120B requests to access the shared file, the storage application 125B retrieves the file from the indicated location. Alternatively, a user can share a file by posting a link to the file on a web page, such as a blog or a social networking system. As used herein, the term "author" refers to the user who created a file and shared it with other users, and the users with whom the file is shared are the "sharees."

Content shared between clients 120 may mirror the file structure defined by an author on the author's client 120. For example, the author may group multiple files into a folder, or may group multiple folders as subfolders of another folder. Rather than sharing individual files, an author may share a folder with sharees. By default, the files or folders underneath the shared folder are also shared with sharees. In one embodiment, authors may be able to deselect individual files or folders underneath a shared folder, preventing the deselected files or folders from being shared with sharees.

Shared files and folders are synchronized between the clients 120. If a user modifies content or metadata of a shared file or folder, the modification is uploaded to the cloud-based storage device 105 and pushed to the sharees. Modifications may include, for example, adding or removing content of a file, adding or removing files from a folder, adding or removing subfolders from a higher level folder, or renaming files or folders.

In one embodiment, the storage application 125 enables authors to define permissions of shared files and folders. Permissions may be read/write (allowing the sharee to modify the shared file or folder) or read-only (allowing the sharee to access the shared file or folder but not modify it). In one embodiment, if a shared file is assigned read-only permissions applying to sharees, the file may be assigned a read-only attribute to be enforced by the operating system executing on the sharee's clients 120. Alternatively, the cloud-based storage device 105 may enforce read-only permissions by pushing a read-only file to the sharees' clients 120 and not uploading versions of the file from the sharees' clients 120.

The permissions defined for the highest level shared folder may be propagated to subfolders and files within the highest level folder. For example, if an author shares a folder that contains five files and defines the permissions of the folder to be read-only, the five files may also be assigned read-only permissions. The highest level shared folder having read/write permissions is referred to herein as a "top-level shared folder," and the highest level shared folder having read-only permissions is referred to herein as a "top-level read-only shared folder."

If a sharee is given read-only permissions to a file or folder, one embodiment of the storage application 125 enables the sharee to modify the file or folder on the sharee's client 120, without uploading the changes to the storage device 105. The storage application 125 detects when a sharee has modified a read-only file or folder and identifies the modified file or folder as local content. The "local content" designation preserves the sharee's changes to a file or folder and may be uploaded to the cloud-based storage device 105 for backup, but local content is not synchronized between other devices of the author or other sharees. In an embodiment a file may be restricted as a read-only file, but a sophisticated user may be able to circumvent the enforcement of such a restriction. Embodiments herein preserve user changes to such a file while maintaining synchronization and read-only requirements from the storage device 105.

As with permissions, the local content designation may be propagated to subfolders and files within a higher-level folder. After identifying a file or folder as local content, the storage application 125 permits modification to the local content files or folder. For example, the storage application 125 may support user activities including deleting and renaming local content items, adding new files or folders under a local content folder, or adding an existing local content folder to another local content folder.

In one embodiment, the storage application 125 stores and enacts rules for managing shared content and local content. The storage application 125 may enact various rules when a user modifies a file or folder, depending on the permissions of the file or folder, such as adding or removing content from a file, renaming a file or folder, or moving files or folders that were originally not synchronized from the cloud-based storage device 105 into a shared folder. The storage application 125 may also apply various rules when a sharee attempts to move files or folders into or out of a read-only folder, such as deleting a read-only file, moving a file or folder from the a read-only domain to another shared or non-shared folder, moving some or all of a read/write domain into a read-only domain, or moving local content into a read-only domain. Furthermore, the storage application 125 may apply various rules when a folder structure including local content is modified by, for example, the author of a shared folder deleting the folder, or a sharee deselecting a folder for synchronization. The rules applied by the storage application 125 are discussed further with respect to FIGS. 3-7.

Communication between the cloud-based storage device 105 and clients 120 is enabled by network 115. In one embodiment, the network 115 uses standard communications technologies and/or protocols. Thus, the network 115 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 305 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 115 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 115 can also include links to other networks such as the Internet.

Figure 2:
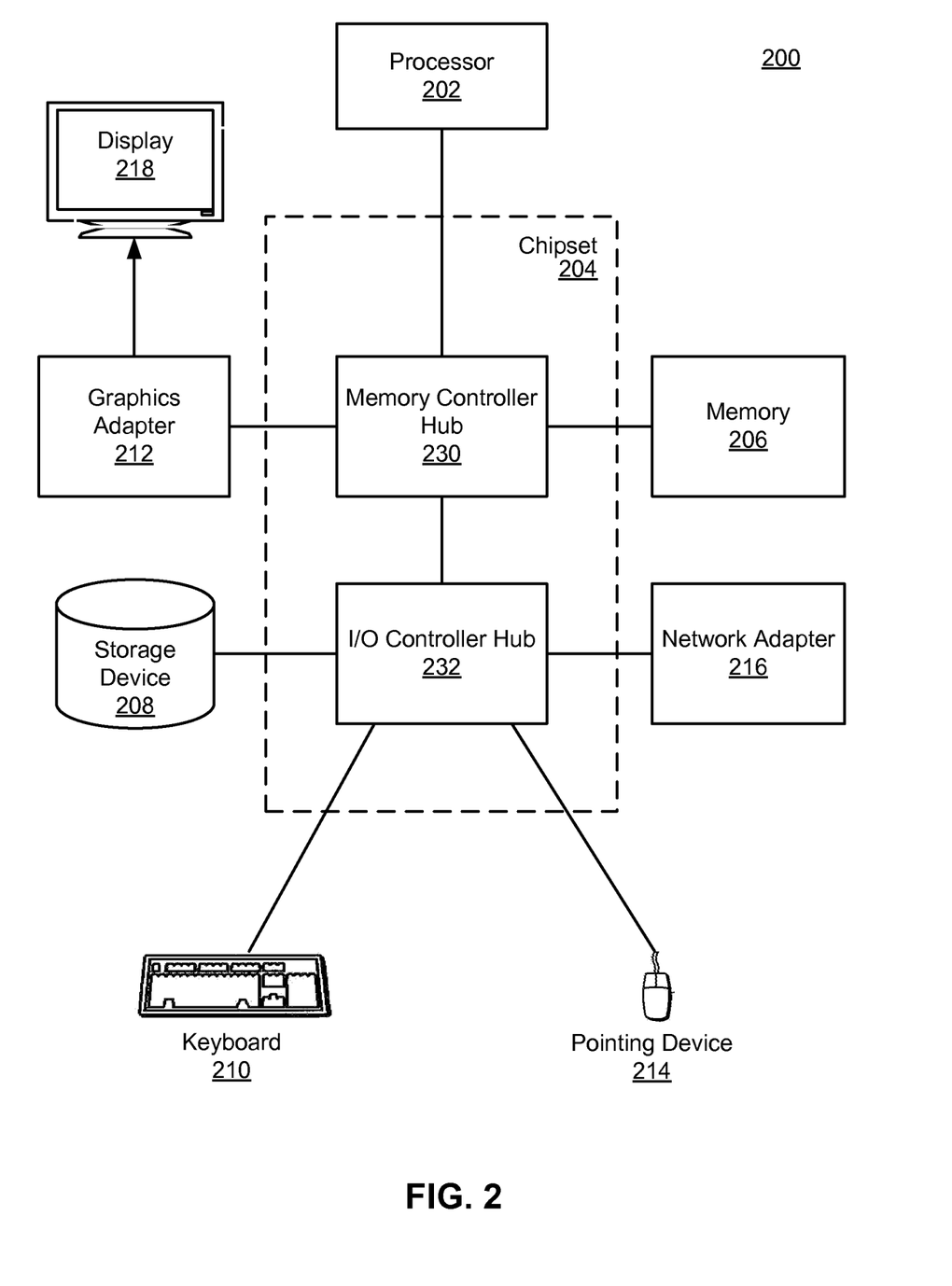
FIG. 2 is a high-level block diagram of a computer for use as a client device, according to one embodiment.

A high-level block diagram of a computer 200, as an example of a client 120, is illustrated in FIG. 2. Illustrated are at least one processor 202 coupled to a chipset 204. The chipset 204 includes a memory controller hub 230 and an input/output (I/O) controller hub 232. A memory 206 and a graphics adapter 212 are coupled to the memory controller hub 230, and a display device 218 is coupled to the graphics adapter 212. A storage device 208, keyboard 210, pointing device 214, and network adapter 216 are coupled to the I/O controller hub 232. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display device 218. The network adapter 216 couples the computer 200 to a network. Some embodiments of the computer 200 have different and/or other components than those shown in FIG. 2. The types of computer 200 can vary depending upon the embodiment and the desired processing power. Other computing devices may alternatively be used as the client 120, such as a tablet, a smart phone, an Internet television, or a gaming console.

Managing Content

The storage application 125 stores and enacts rules for managing local content and shared content. Various embodiments of these rules are illustrated in FIGS. 3-7. Although the rules are discussed herein with respect to folders, the rules may be applied at any level in a folder hierarchy including top-level folders, subfolders, and files.

Figure 3A:
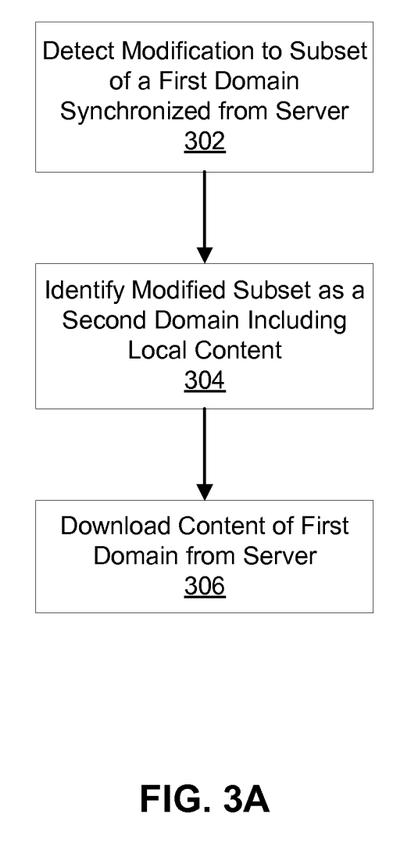
FIG. 3A is a flowchart illustrating a method for creating local content, according to one embodiment.

FIG. 3A illustrates steps performed by the storage application 125 for creating local content within a shared, read-only domain. For example, the read-only domain may be a top-level read-only shared folder and its subfolders and files. The read-only domain is synchronized between two or more clients 120 from a server, such as the cloud-based storage device 105.

A user may attempt to modify the first domain on a client 120 by, for example, creating a file or folder within the first domain, moving a folder from outside the storage application 125 to the first domain, adding content to a file, or removing content from a file. As illustrated in FIG. 3A, the storage application 125 detects 302 modifications to a subset of the first domain. Detecting modifications may include detecting a new date or time of the last write to a file or folder or detecting changes to the size of a file or folder. For example, if a user creates a new file within a top-level read-only shared folder, the storage application 125 may detect that the size of the folder has increased.

In one embodiment, the storage application 125 compares the properties of folders on a client 120 to properties of the folders received from the cloud-based storage device 105. For example, the storage application 125 may keep a log of the size of files and folders when they are downloaded from the storage device 105. If the size of a file does not match the size indicated in the log, the storage application 125 may identify the file as local content. As another example, storage application 125 may receive an indication of the last modification time of a file or folder on the storage device 105. If the storage application 125 detects a folder write time that is later than the modification time of the folder on the storage device 105, the storage application 125 may identify the folder as having locally-modified content. Alternatively, the storage application 125 may determine that a folder has locally-modified content based on checksums or hashcodes, or the storage application 125 may receive events from the operating system of the client device 120 indicating that a folder has been modified.

The storage application 125 identifies 304 the modified subset of the first domain as a second domain of content that includes local content. In one embodiment, the storage application 125 may rename a modified file or folder to identify it as having local content while maintaining an association to the original file or folder. For example, if a read-only file having the name "filename.extension" is modified by a sharee, the storage application 125 may rename the file to "filename(Local Content).extension" to indicate to the sharee that the file is local content. Although a user may change the name of a local content file (e.g., remove the "(Local Content)" designation), the storage application 125 may rename the file at every synchronization cycle. In another embodiment, the storage application 125 flags a modified file or folder with a local content flag that identifies it to the storage application 125 and the cloud-based storage device 105 as having local content. The cloud-based storage device may be configured to store files and folders with local content flags in a dedicated local content file database 110. In yet another embodiment, the storage application 125 flags a file or folder with a local content flag in the local database 130, identifying the file or folder as content not to be synchronized from the cloud-based storage device 105.

To preserve the fidelity of the first domain, the storage application 125 may download 306 the original content of the modified subset from the cloud-based storage device 105. For example, if a read-only file is modified by sharee and identified as local content, the storage application 125 may retrieve the original read-only file from the storage device 105. The original file may be treated by the storage application 125 as distinct from the associated local content file. As such, when changes are made to the content of the first domain on the server (e.g., the author adds content to a file), the changes may be pushed to sharees without overwriting local modifications.

Figure 3B:
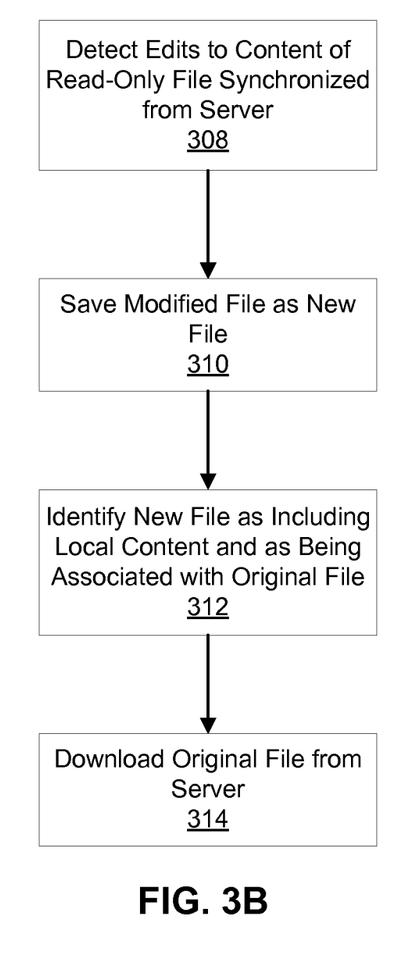
FIG. 3B is a flowchart illustrating a method for creating a local content file, according to one embodiment.

FIG. 3B illustrates an example use case of the process of FIG. 3A, applied to a read-only file synchronized from the cloud-based storage device 105. The storage application 125 detects 308 edits to content of the shared read-only file based on the write time, the file size, or other properties of the file. The storage application 125 saves 310 the modified file as a new file, and identifies 312 the new file as including local content. For example, the new file may be assigned a different name than the original file, or may be flagged as having local content. In one embodiment, the storage application 125 also identifies 312 the new file as being associated with the original file. The storage application 125 may download 314 the original file from the cloud-based storage device 105. Alternatively, the storage application 125 may restore the original file without communicating with the storage device 105. For example, the client 120 may cache some or all of a file received from the storage device 105; the storage application 125 may restore the original file by retrieving it from the cache of the client 120.

The process illustrated in FIG. 3B may also be used to manage conflicts when an author changes a file's permissions. For example, an author gives a sharee read/write access to a shared file. While the sharee is editing the file, the author changes the permissions to read-only. The sharee's edits prior to the permission change may be uploaded to the storage device 105, but after the permissions change the storage application 125 detects 308 that the file has been modified. The storage application saves 310 the modified file as a new file to contain the sharee's modifications, identifies 312 the new file as including local content, and downloads 314 the original file from the cloud-based storage device 105.

Figure 4:
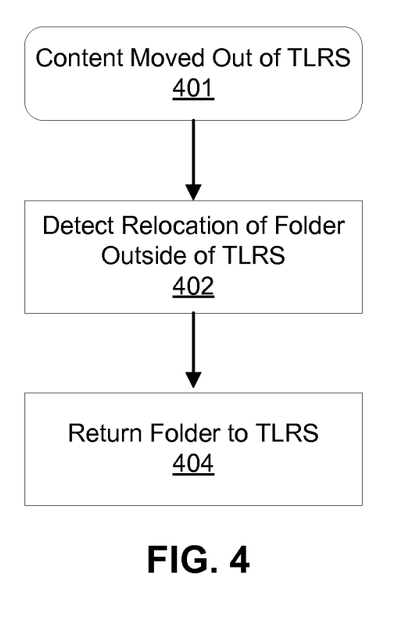
FIG. 4 is a flowchart illustrating a rule enacted by a storage application for content moved outside of a read-only domain, according to one embodiment.

FIG. 4 illustrates steps performed by the storage application 125 when a user attempts to move 401 content out of a read-only domain. For example, a user may attempt to move a folder from the read-only domain by deleting the folder, moving the folder outside of the storage application 125, or moving the folder to a different folder within the storage application 125. The storage application 125 detects 402 a restructuring of the read-only folder hierarchy in the form of a folder relocated outside of a top-level read-only shared folder. For example, the storage application 125 may detect 402 the restructuring by detecting a change to the path of a folder from a read-only folder to another location.

In response, the storage application 125 returns 404 the folder to its original location in the top-level read-only shared folder. In one embodiment, the storage application 125 returns 404 the folder to its original location by deleting the moved folder and downloading the original folder from the cloud-based storage device 105. In another embodiment, to reduce the communication bandwidth between the client 120 and the storage device 105, the storage application 125 returns 404 the folder to its original location by moving the folder from the attempted destination to its original location. For example, if a user attempts to delete a folder from the top-level read-only shared folder, the client 120 may create a file listing metadata of the folder, including the path to its network location, and store the metadata file in a temporary storage reserved for deleted files such as the Recycling Bin of MICROSOFT Windows, the Trash Can of MAC OS X, or a specialized file directory of the storage application 125. The storage application 125 returns 404 the deleted folder to its original location by retrieving the metadata file from the temporary storage and generating a link to the original file based on the metadata. In yet another embodiment, the storage application 125 copies a folder to the location specified by a user, and leave the original folder in its location in the top-level read-only shared folder.

Figure 5:
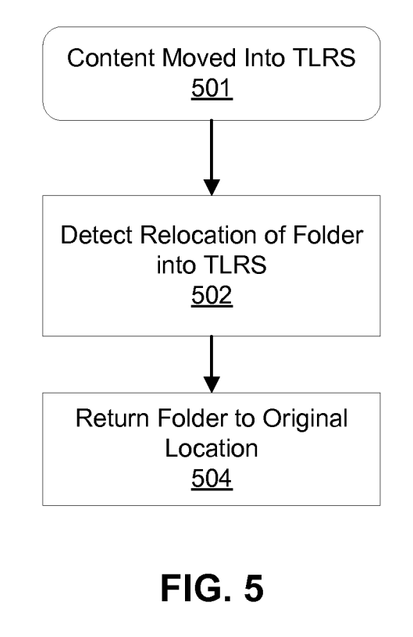
FIG. 5 is a flowchart illustrating a rule enacted by a storage application for content moved into a read-only domain, according to one embodiment.

FIG. 5 illustrates steps performed by the storage application 125 when a user attempts to move 501 content into a top-level read-only shared folder. For example, a user may attempt to move a read/write-enabled shared folder, a private folder, or a local folder into a top-level read-share. The storage application 125 detects 502 a restructuring of the read-only folder hierarchy in the form of a folder moved into the top-level read-only shared folder. In response, the storage application 125 returns 504 the folder to its original location external to the top-level read-only shared folder.

Figure 6:
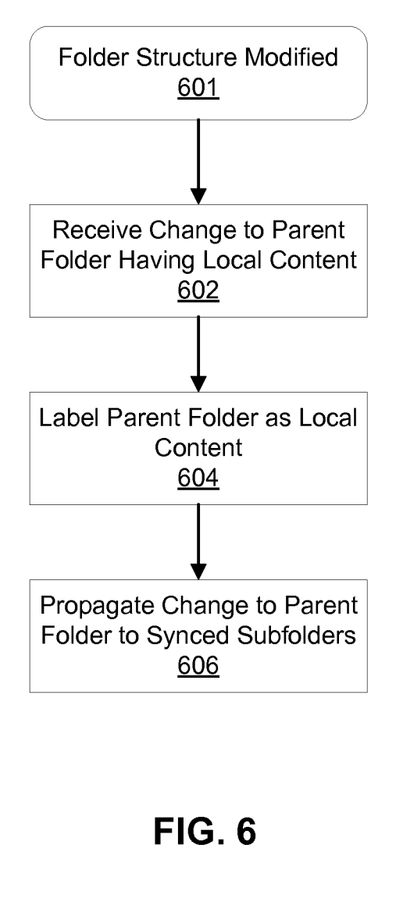
FIG. 6 is a flowchart illustrating a rule enacted by a storage application for modifications to file structure within a read-only domain, according to one embodiment.

FIG. 6 illustrates steps performed by the storage application 125 when the structure of folders including local content is modified 601. For example, the owner of a parent folder including local content may delete the folder, or a sharee deselecting a parent folder for synchronization. The storage application 125 receives 602 a change to a parent folder including local content. The storage application 125 labels 604 the modified parent folder as local content by adding a local content designation to the name of the folder or adding a local content flag to the folder.

In one embodiment, the storage application 125 propagates 606 the change to the parent folder to content beneath the folder. For example, if a shared parent folder including one local content file and one shared file is deleted by the owner, the storage application 125 may label 604 the parent folder as local content and propagate 606 the deletion of the parent folder to the shared file by deleting the shared file. In another embodiment, the storage application 125 propagates 606 the change to the parent folder by labeling all content beneath the parent folder as local content. In the example above, rather than deleting the shared file beneath a deleted parent folder, the storage application 125 may identify the shared file as local content.

Figure 7A:
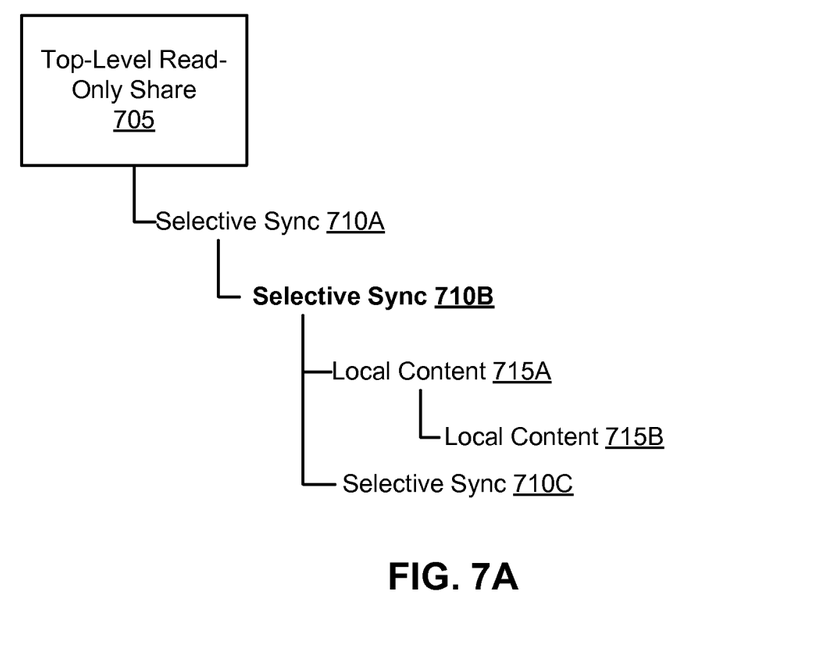
FIG. 7A-7B is a diagram illustrating a modification to a file structure including local content, according to one embodiment.
Figure 7B:
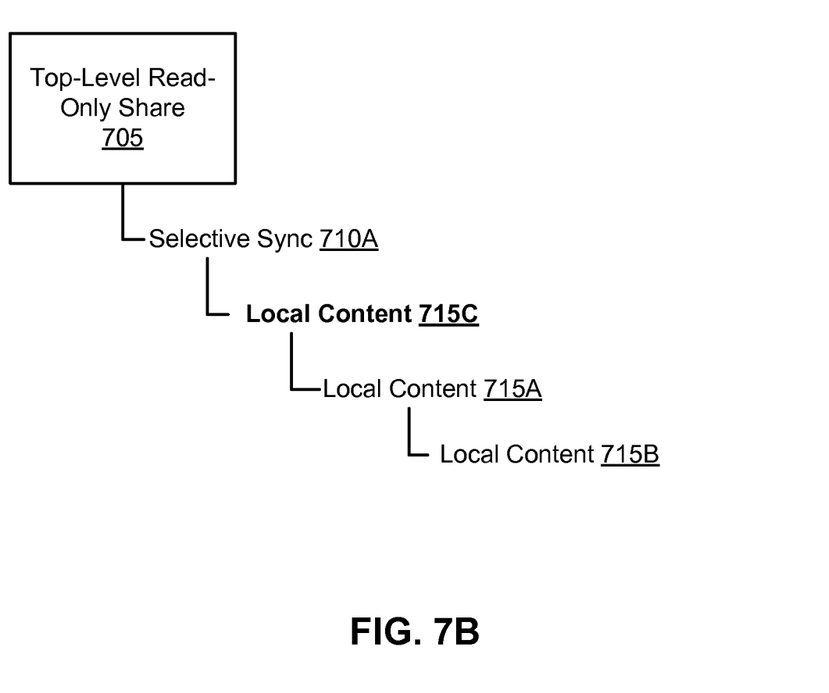

FIG. 7A-B illustrates an example modification to a folder structure beneath a top-level read-only shared folder 705. In the illustrated example, the folder structure is a logical organization of files within the storage application 125 executing on a sharee's client device 120. As illustrated in FIG. 7A, the top-level read-only shared folder 705 includes a selective sync folder 710A, which is a shared read-only folder. In turn, selective sync 710A includes selective sync 710B, which includes a local content folder 715A and a selective sync folder or file 710C. The top-level read-only shared folder 705 is synchronized between clients 120 from the cloud-based storage-device 105.

FIG. 7B illustrates selective sync 710B removed from the folder hierarchy. For example, the folder may have been deleted by the owner, or the sharee may have deselected selective sync 710B for synchronization. Because removing selective sync 710B from the sharee's storage application 125 would result in the loss of the sharee's local content 715, the storage application 125 identifies the selective sync folder 710B as local content folder 715C. As illustrated in FIG. 7B, the storage application 125 deletes the content of the selective sync 710B that is not local content (i.e., selective sync 710C). Alternatively, the storage application 125 may identify selective sync 710C as local content that is still accessible to the sharee.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer program product comprising a non-transitory computer readable medium storing program instructions for a client storage application executable to:

access, by a first client associated with a first user, a first domain that is a client version of a shared domain, the shared domain synchronized between a plurality of clients from a server, the shared domain including a shared folder selected for selective synchronization and the first domain including a first folder corresponding to the shared folder, the first folder including shared content synchronized from the shared domain and locally-modified content, the shared domain organized according to a first folder hierarchy and the client version of the shared domain organized according to a client folder hierarchy that reflects the first folder hierarchy, the shared folder having a read-only permission for the first user and the shared content in the first folder having an associated attribute based on the read-only permission that instructs the client storage application to allow modifications to the shared content in the first folder without modifying the shared content in the shared domain for synchronization between the plurality of clients;

receive, by the first client, an indication of a change by a second user to the shared folder at the server;

responsive to the indication of the change received by the first client:

propagate the change to the shared content below the first folder in the client folder hierarchy at the first client; and based on a determination that the first folder contains the locally-modified content, designate the first folder as a local content folder not to be synchronized between the plurality of clients; and maintain the local content folder and the locally-modified content in the client folder hierarchy at the first client.

2. The computer program product of claim 1, wherein the program instructions are executable to:
- receive original content of the first folder, the original content associated with the associated attribute;
- detect a modification of the original content to create the locally-modified content in the first folder on the first client;
- based on detecting the modification and the associated attribute:
  - designate the locally-modified content as local content; and
  - establish a hierarchical relationship between the locally-modified content and the first folder at the first client.

3. The computer program product of claim 2, wherein designating the locally-modified content as local content comprises saving a locally-modified file from the first folder as a new file in the first folder and labelling the new file as including local content.

4. The computer program product of claim 2, wherein the program instructions are executable to redownload the original content to the first client based on detecting the modification of the original content on the first client.

5. The computer program product of claim 1, wherein the program instructions are executable to upload the locally-modified content to the server for storage in a local content file database with permissions to prevent other clients of the plurality of clients from accessing the locally-modified content.

6. The computer program product of claim 1, wherein the program instructions are executable to designate the first folder as the local content folder by setting a local content flag associated with the first folder.

7. The computer program product of claim 1, wherein the indication of the change comprises an indication to delete the first folder from the client folder hierarchy at the first client.

8. The computer program product of claim 7, wherein propagating the change to the shared content below the first folder in the client folder hierarchy comprises deleting shared folders and files below the first folder in the client folder hierarchy.

9. The computer program product of claim 7, wherein maintaining the local content folder and the locally-modified content in the client folder hierarchy comprises establishing a hierarchical relationship between the local content folder and an ancestor of the first folder and establishing a hierarchical relationship between the locally-modified content and the local content folder in the client folder hierarchy at the first client.

10. The computer program product of claim 1, wherein the shared folder is owned by a first owner and the local content folder is owned by a second owner.

11. A system for cloud-based read-only folder synchronization comprising:
- a cloud-based storage device configured to provide files to a plurality of clients;
- a first client coupled to the cloud-based storage device by a network, the first client associated with a first user, the first client comprising a processor and a memory coupled to the processor, the memory storing program instructions for a client storage application executable by the processor to:
  - access a first domain that is a client version of a shared domain synchronized between the plurality of clients from the cloud-based storage device, the shared domain including a shared folder selected for selective synchronization and the first domain including a first folder corresponding to the shared folder, the first folder including shared content synchronized from the shared domain and locally-modified content, the shared domain organized according to a first folder hierarchy and the first domain organized according to a client folder hierarchy that reflects the first folder hierarchy, the shared folder having a read-only for the first user and the shared content in the first folder having an associated attribute based on the read-only permission that instructs the client storage application to allow modifications to the shared content in the first folder without modifying the shared content in the shared domain for synchronization between the plurality of clients;
  - receive an indication of a change by a second user to the first folder at the cloud-based storage device;
  - responsive to the indication of the change:
    - propagate the change to the shared content below the first folder in the client folder hierarchy at the first client; and
    - based on a determination that the first folder contains the locally-modified content, designate the first folder as a local content folder not to be synchronized between the plurality of clients; and
  - maintain the local content folder and the locally-modified content in the client folder hierarchy at the first client.

12. The system of claim 11, wherein the program instructions are executable to:
- receive original content of the first folder from the cloud-based storage device, the original content associated with the associated attribute;
- detect a modification of the original content to create the locally-modified content in the first folder on the first client;
- based on detecting the modification and the associated attribute:
  - designate the locally-modified content as local content; and
  - establish a hierarchical relationship between the locally-modified content and the first folder at the first client.

13. The system of claim 12, wherein designating the locally-modified content as local content comprises saving a locally-modified file from the first folder as a new file in the first folder and labelling the new file as including local content.

14. The system of claim 12, wherein the program instructions are executable to redownload the original content to the first client based on detecting the modification of the original content on the first client.

15. The system of claim 11, wherein the program instructions are executable to upload the locally-modified content to the cloud-based storage device for storage in a local content file database with permissions to prevent other clients of the plurality of clients from accessing the locally-modified content.

16. The system of claim 11, wherein the program instructions are executable to designate the first folder as the local content folder by setting a local content flag associated with the first folder.

17. The system of claim 11, wherein the indication of the change comprises an indication to delete the first folder from the client folder hierarchy at the first client.

18. The system of claim 17, wherein propagating the change to the shared content below the first folder in the client folder hierarchy comprises deleting shared folders and files below the first folder in the client folder hierarchy.

19. The system of claim 17, wherein maintaining the local content folder and the locally-modified content in the client folder hierarchy comprises establishing a hierarchical relationship between the local content folder and an ancestor of the first folder and establishing a hierarchical relationship between the locally-modified content and the local content folder in the client folder hierarchy at the first client.

20. The system of claim 11, wherein the shared folder is owned by a first owner and the local content folder is owned by a second owner.

* * * * *